United States Patent Office 3,428,591
Patented Feb. 18, 1969

3,428,591
WAX COMPOSITIONS CONTAINING GRAFT POLYMER OF POLYETHYLENE AND TO PAPERBOARDS COATED THEREWITH
Walter E. F. Lewis, Stamford, Conn., assignor to Atlantic Richfield Company, Philadelphia, Pa., a corporation of Pennsylvania
No Drawing. Filed Jan. 30, 1968, Ser. No. 701,563
U.S. Cl. 260—28.5        11 Claims
Int. Cl. C08f 45/52; B32b 23/08

ABSTRACT OF THE DISCLOSURE

This invention relates to coated paperboards and to coating compositions containing wax and a polyethylene graft polymer which impart superior wet strength properties when applied to paperboard. The graft polymer is prepared by reacting a polyethylene with maleic anhydride. It contains from 0.1 to 5 percent by weight maleic anhydride. The amount of graft polymer utilized in the coating compositions ranges from 0.1 to 4 percent by weight.

BACKGROUND OF INVENTION

In the field of coated corrugated paperboard two performance factors of the wax coating are very important. The first is the degree to which the coating protects the paperboard from moisture (wet strength retention) and the second involves the amount of coating which is picked up by the board during the dipping operation. Ideally, the coating should impart maximum moisture protection with the minimum amount of wax pickup. Various compounds such as polyethylene, ethylene/vinyl acetate copolymers, fatty acid soaps, polyterpenes, hydrocarbon resins and ethylene-propylene rubbers have been added to wax to improve its moisture protection characteristics. The incorporation of these additives, however, while improving the moisture protection always results in a substantial increase in wax pickup.

It has now been discovered that by adding certain small amounts of a particular polyethylene graft polymer to the wax its moisture protection characteristics can be greatly enhanced with little or no increase in wax pickup. This phenomenon is unexpected since there is nothing to indicate that the modification of polyethylene would impart this unusual property.

The modified polyethylene which is utilized in the practice of this invention is a graft polymer prepared by substituting the maleic anhydride radical on a polyethylene chain. It should be pointed out that this is a true graft polymer and not a copolymer since the maleic anhydride only reacts with the terminal carbons of the polyethylene chain. There is no homopolymerization of maleic anhydride nor substitution of maleic anhydride as an internal structural member of the backbone polyethylene chain.

It has been known in the art that the addition of ethylene copolymers to wax compositions can alter the properties thereof. For example, Lippincott et al. 2,599,339 (1952) discloses a wax composition containing a minor amount of a copolymer of an olefin with a 1,2-dicarboxylic acid or its derivative which has been modified with an alcohol or amine. These copolymers are prepared by reacting the olefin monomer with the dicarboxylic acid. Thus, the acid is polymerized directly into the polymer chain. Furthermore, the copolymer required at least 20 mole percent of the acid component and also a further reaction with an amine or alcohol. The structure of these copolymers is entirely different from the modified polyethylenes of the instant invention.

MacLeod 3,165,485 (1965) also discloses a wax composition which contains a copolymer of ethylene and a dicarboxylic acid diester to improve the sealing properties of the wax composition. These copolymers, however, are also prepared by a direct polymerization of dicarboxylic acid ester in the main polymer chain.

Butler 2,676,934 (1954) discloses another copolymer of styrene with maleic anhydride as a wax additive to improve tensile strength and other properties of the composition. None of these references, however, disclose a graft polymer.

Therefore, it is an object of this invention to provide wax/polymer compositions which impart superior wet strength properties to coated substances.

It is a further object of this invention to provide a coated paperboard which has outstanding wet strength properties.

The modified polyethylene which is utilized in the practice of this invention is prepared by grafting maleic anhydride onto a polyethylene backbone. Preferably, a low density polyethylene is utilized. The term "low density" is well understood by those skilled in the art and denotes polyethylene having a specific gravity from about 0.85 to about 0.93. Because of the branching, low density polyethylene provides a greater number of grafting sites. The polyethylene should be a solid at room temperature and consequently, have an average molecular weight in excess of about 1,500. The only practical limitation of the maximum molecular weight is determined by the solubility of the polymer in the wax. Preferably, the average molecular weight ranges from about 1500 to 25,000 and most preferably 2500 to 15,000.

The reaction is carried out by combining the two ingredients at elevated temperatures. The reaction can be carried out in the presence of a solvent such as hexane, toluene, or xylene. A catalyst, including irradiation, can be utilized if desired. A suitable method for grafting the maleic anhydride is disclosed in Cheritat 3,342,771 (1967) which is hereby incorporated by reference into this specification. Other methods are disclosed in "Block and Graft Copolymers," Burlant and Hoffman, Reinhold (1960); in "Block and Graft Copolymers," Ceresa, Butterworth (1962); and in Belgian Patent No. 695,429 which are hereby incorporated by reference into this specification.

The amount of maleic anhydride which can be grafted onto the polyethylene ranges from 0.1 to 5 percent by weight based on the total weight of the grafted polymer. It has been found, however, that only small amounts of the anhydride are required to impart the improved properties to the polymer. Preferably, the amount of grafted maleic anhydride ranges from 0.5 to 2 percent and most preferably is about one percent by weight.

The amount of graft polymer which can be utilized in the practice of this invention ranges in amounts up to 4 percent based upon the total weight of wax and modified polyethylene. At loadings of less than 0.1 percent, however, very little improvements in moisture protection is obtained. At loadings above 4 percent the increase in wet strength properties is not sufficient to compensate for the increase in wax pickup, coating viscosity and cost which accompany the higher loadings. Preferably, the loading ranges from 0.5 to 2 percent and most preferably about 1.5 percent based on the total weight of wax and modified polyethylene.

The waxes which can be utilized in practice of this invention are those obtained from petroleum sources. These waxes include paraffin waxes which have a melting point from about 115° F. to about 200° F. (ASTM D-87) and the microcrystalline waxes having a melting point from about 140° F. to 210° F. (ASTM D-127). These can be fully refined and thus contain very small amounts of hydrocarbon oils or they can be semi-refined (scale waxes)

and have hydrocarbon oil contents of up to about 3 percent.

The preferred compositions of this invention utilize a combination of petroleum waxes comprising from 75 to 95 percent by weight of a paraffin wax having a melting point ranging from about 120° F. to about 160° F. (ASTM D-87), and from 5 to 25 percent of microcrystalline wax having a melting point ranging from about 130° F. to about 180° F. (ASTM D-127). This wax mixture provides a coating which has good physical strength and blocking properties.

Ingredients commonly added to wax or ethylene polymers can be incorporated into the compositions of this invention in functional amounts without departing from the scope thereof. Examples of these ingredients include but are not limited to: heat and ultraviolet light stabilizers, inert fillers, secondary plasticizers, anti-blocking agents, pigments and colorants, anti-oxidants, gloss stabilizers, viscosity-index improvers, solvents, anti-scuff agents, etc.

The preparation of the compositions of this invention is not critical to the practice thereof and can be conducted under any suitable method. For example, these compositions can be prepared by heating the wax to a temperature above its melting point, adding the graft polymer and agitating until a homogeneous mixture is obtained.

Similarly, the coated board is prepared by methods well-known to those skilled in the art. For example, the coating can be deposited on the paperboard utilizing dip, roll, curtain or spray coating techniques. The coating can be applied as a hot melt or by utilizing a solvent system.

In the following examples the properties of the wax are reported as percent wax pickup, percent wet strength retention and efficiency.

The percent wax pickup is measured by weighing the unwaxed board and the waxed board after the wax is cooled. The percent wax pickup is equal to the change in weight after coating divided by the weight of the unwaxed board, times 100.

The percent wet strength retention is the amount of force required to crush a wet waxed sample divided by the amount of force required to crush a dry unwaxed sample times 100. This test is called the short column crush test. The efficiency is the wet strength retention divided by the wax pickup.

The short column crush test is run as follows:

(A) Dry Crush Test (done on unwaxed board)

1" x 2" samples with the long dimension parallel to the flutes are cut from a portion of unwaxed paperboard. All cuts should be sharp and true, corners 90° and the flutes should be parallel and perpendicular to sides and ends respectively. The sample orientation with respect to the flutes should be such that cuts parallel to the flutes are made through the rise between the glue lines. Ten samples are taken for each test. The top and bottom of each sample is dip coated with a thick coating of a low melt wax along an area of about 1/8" deep. The purpose of this coating is to reinforce the edges to prevent failure at this point during the test. Consequently, the type of wax and the actual thickness of the coating is immaterial as long as it sufficiently strengthens the edges. The samples are then allowed to age overnight at 73° F. and 50 percent relative humidity before testing. A sample is then aligned with the flutes vertically in a column compression jig (column compression attachment—Testing Machines Inc.). The sample is then inserted into a Hinde and Dauch crush tester and the crushing plate is lowered until the specimen fails. The maximum force required in pounds/inch of sample is recorded as the crush strength.

(B) Wet Crush Test (run on the waxed wet conditioned board)

A 12" x 12" portion of the waxed board is cut in such a manner so as the center 4" is removed thus making the total dimensions of the sample 4" x 12". It is cut with the short dimension parallel to the flute. In all other respects it is cut in the same manner as in the Dry Crush Test procedure. All four edges are lightly waxed with a low melt point paraffin wax to coat and seal exposed fibers. The samples are then weighed and placed in a constant temperature water bath, held at 73° ± 1° F. The sample is positioned in the bath vertically so that the upper edge is stationed 1" below the surface of the liquid. From the center of the 4" x 12" specimen ten 1" x 2" specimens are cut according to the procedure in the Dry Crush Test taking care to have the proper orientation of flutes. The tops and bottoms are heavily waxed to reinforce the edges and the crust test is run immediately after this wax cools in accordance with the procedure for the Dry Crush Test. No longer than 10 minutes should elapse between the time the 4" x 12" sample is removed from the water bath and the time the crush test on the 1" x 2" samples are run. The average of force required for each of the 10 specimens is reported as the crush strength. The percent wet strength retained is then reported as the average value of the wet short column crush test on the wet waxed specimen divided by the average value of the dry unwaxed specimen times 100.

Paperboard coated with the wax compositions of this invention can be utilized in the numerous applications which require boards having good wet strength properties such as in shipping containers for dressed poultry.

The following examples are given to illustrate specific embodiments of the invention and are not to be defined as the scope of the invention. All parts and percentages are by weight.

EXAMPLE I

The wax/polymer blends were prepared by heating the wax to 275° F. and then adding the polymer. Agitation of the mixture was continued for 30 minutes until a homogeneous blend was obtained. Microcrystalline wax having a melt point of 158° F. (ASTM D-127) was utilized. Formulation No. 1 represents the control which is 100 percent wax. The polymer loading in Formulations 2–8 was 2 percent by weight.

Corrugated paperboard was dipped in the wax polymer blend at 180° F. and then allowed to drain at 180° F. The properties of the coated board are reported in Table I.

PE/MA designates a graft polymer of low density polyethylene which utilized maleic anhydride as the grafted monomer. The polymer has an average molecular weight of about 7,000 and contains about 0.7 percent by weight maleic anhydride. It also has the following properties:

Ring and ball softening point
 (ASTM D-36-26) _____ 106° C.
Penetration at 77° F. 100 gm./
 5 sec./25° C. _____ 5 tenths of a millimole.
Brookfield viscosity at 300° F.
 (#3 Spindle—12 r.p.m.) ____ 12,500 centipoises.
Tensile strength _____ 800 p.s.i.

TABLE I

| Formulation Number | 1 | 2 | 3 | 4 | 5 | 6 |
|---|---|---|---|---|---|---|
| Type Polymer | (1) | (1) | (1) | (2) | (3) | |
| Molecular Weight | 3,200 | 7,000 | 10,000 | 8,000 | 8,000 | |
| Specific Gravity | 0.91 | 0.9 | | 0.80 | 0.91 | |
| Softening Point, ° F | 266 | 219 | | 203 | 222 | |
| Evaluation: | | | | | | |
| Wax Pickup | 48 | 66 | 53 | 71 | 50 | 53 |
| Percent Percent Wet Strength Retention | 35 | 50 | 39 | 59 | 33 | 45 |
| Efficiency | 0.70 | 0.53 | 0.73 | 0.83 | 0.66 | 0.85 |

[1] Polyethylene.
[2] Polypropylene.
[3] Polyethylene modified with maleic anhydride.

Formulation No. 1 represents the control which is composed solely of wax. Formulation No. 2 demonstrates that low molecular weight unmodified polyethylene while providing an increase (43%) in wet strength properties also causes a much heavier loading of wax (37%) to be deposited on the board. It is this heavier coating which provides the additional protection. Protection obtained through the use of heavier coatings is not desired nor practical in commercial operations. Formulation No. 3 represents an unmodified polyethylene having the same physical characteristics as the graft polymer of Formulation No. 6. Note that while the increase in wax pickup is small (10%) the corresponding improvement in wet strength properties is only 11 percent. Formulation No. 6, however, an embodiment of this invention, provides an increase in wet strength of 28% while causing an increase in wax pickup of only 10%. Formulation Nos. 4 and 5 demonstrate that various other unmodified polyethylenes and polypropylenes impart excessive wax loadings without adequately improving the wet strength properties of the boards.

EXAMPLE II

The following formulations were prepared in accordance with the procedure set forth in Example I. The polyethylene graft polymer and wax were the same as those described in Example I.

TABLE II

| Formulation Number | 7 | 8 | 9 | 10 | 11 | 12 |
|---|---|---|---|---|---|---|
| Loading—PE/MA, weight percent | | 1 | 1.5 | 2 | 5 | 10 |
| Evaluation: | | | | | | |
| Wax pickup | 48 | 45 | 51 | 53 | 88 | 120 |
| Percent Wet Strength Retention | 35 | 41 | 63 | 45 | 139 | 178 |
| Efficiency | 0.70 | 0.91 | 1.23 | 0.85 | 1.58 | 1.49 |

From the above data it is demonstrated that paperboard coated with compositions containing 5 percent graft polymer while having good wet strength retention contain excessive amounts of wax which inhibits their use in commercial applications. It is also shown that the optimum loading of graft polymer is about 1.5 percent. The efficiency of the coating is considerably better at 1.5 percent than at either the one or the two percent loadings.

EXAMPLE III

A composition is prepared utilizing 83.5% paraffin wax, 15 percent microcrystalline wax and 1.5% of the graft polymer of Example I. Paperboard coated with this composition has outstanding wet strength properties with very little wax pickup.

I claim:
1. A wax composition which imparts outstanding wet strength properties to paperboard which consists essentially of from 96 to 99.1 percent by weight of a petroleum wax and from 0.1 to 4.0 percent by weight of a polyethylene graft polymer containing as the grafted monomer from 0.1 to 5.0 percent by weight maleic anhydride.
2. A composition according to claim 1 wherein the amount of maleic anhydride present in the graft polymer ranges from 0.5 to 2.0 percent.
3. A composition according to claim 2 wherein the amount of maleic anhydride is about 1 percent.
4. A composition according to claim 1 wherein the wax is selected from the group consisting of paraffin wax, microcrystalline wax and mixtures thereof.
5. A composition according to claim 4 wherein the concentration of the paraffin wax ranges from 75 to 95 percent and the concentration of the microcrystalline wax ranges from 5 to 25 percent of the total wax loading.
6. A composition according to claim 1 wherein the concentration of the graft copolymer in the wax ranges from 0.5 to 2.0 percent.
7. A composition according to claim 1 wherein the graft copolymer has a molecular weight ranging from 2,500 to 15,000.
8. A composition according to claim 1 wherein the graft copolymer has as a backbone a low density polyethylene having a molecular weight of about 7,000.
9. A composition according to claim 1 consisting essentially of
 (a) from 98 to 99.5 percent by weight of a wax component containing from 75 to 95 percent paraffin wax and 5 to 25 percent microcrystalline wax,
 (b) from 0.5 to 2.0 percent by weight of a low density polyethylene graft polymer having a low molecular weight of about 7,000 and containing as a grafted monomer about 1 percent by weight maleic anhydride.
10. A paperboard having deposited upon at least one surface thereof the composition of claim 1.
11. A paperboard having deposited upon at least one surface thereof the composition of claim 9.

References Cited

UNITED STATES PATENTS 3,261,798  7/1966  Farley _____ 117—155
3,267,083  8/1966  Imhof _____ 260—897

MORRIS LIEBMAN, *Primary Examiner.*

L. T. JACOBS, *Assistant Examiners.*

U.S. Cl. X.R.

117—155, 158; 260—897